Dec. 11, 1951   T. J. BEAUDET   2,578,122
JUICE EXTRACTING DEVICE
Filed July 26, 1949   2 SHEETS—SHEET 1

INVENTOR.
TELESPHORE J. BEAUDET
BY
Townsend and Townsend
ATTORNEYS

Dec. 11, 1951  T. J. BEAUDET  2,578,122
JUICE EXTRACTING DEVICE
Filed July 26, 1949  2 SHEETS—SHEET 2
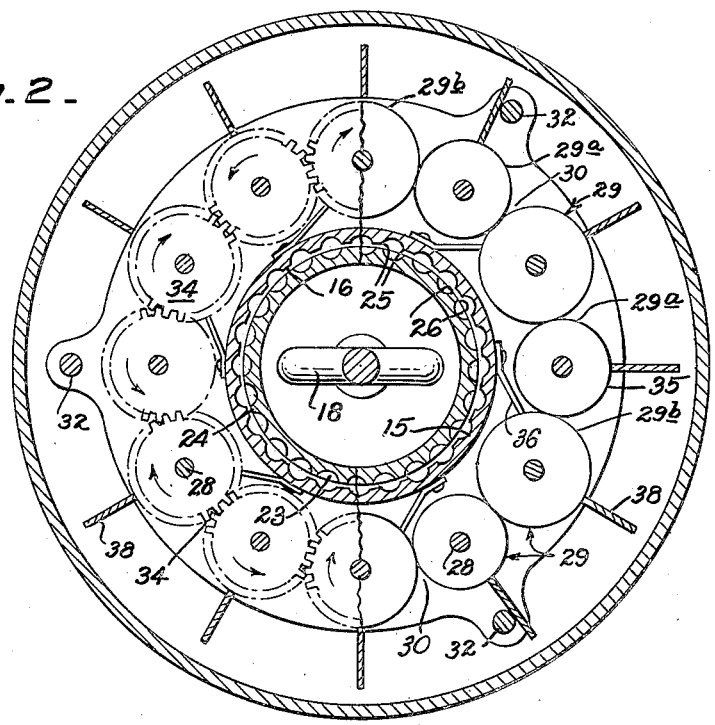
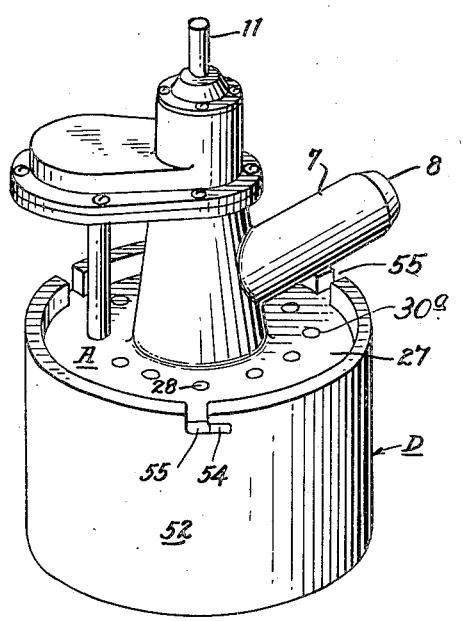
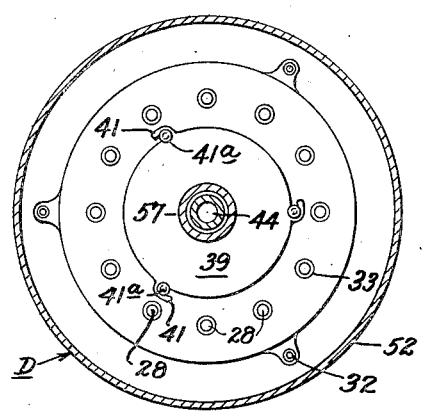
INVENTOR.
TELESPHORE J. BEAUDET
BY
Townsend and Townsend
ATTORNEYS Patented Dec. 11, 1951

2,578,122

UNITED STATES PATENT OFFICE 2,578,122

JUICE EXTRACTING DEVICE

Telesphore J. Beaudet, Glen Ellen, Calif., assignor to Stephen S. Townsend, Piedmont, and Charles E. Townsend, Jr., Oakland, Calif.

Application July 26, 1949, Serial No. 106,852

6 Claims. (Cl. 100—47)

1

This invention relates to a device for extracting juices from food materials, such as vegetable and fruits and the like.

The particular embodiment of my invention which is illustrated in the drawings and which will be described hereinafter in greater detail comprises, generally, a housing having an admission port communicating to the interior of the housing wherein there is situated a pulverizing or grinding mechanism to pulverize lumps of fruit or vegetable material to convert them into a wet mash or conglomerate mixture consisting of the pulp and juice of the food material. The pulverizing or grinding mechanism is arranged to forward or feed the pulverized material into a substantially liquid-tight container or receptacle. A plurality of cylindrical rotatably mounted squeezers or rollers comprise the side walls of the container, and a bottom piece or plug is mounted detachably with respect to the rollers and in substantial liquid-seal relationship therewith. Agitators associated with the rotatable grinder are adapted to continuously stir and move by centrifugal force the pulp content of the mash in the container in a direction toward the cylindrical squeezers, whereby the said squeezers, upon rotation, squeeze the juice from the pulp content leaving only the juice content within the container. A siphon is provided in the container to permit withdrawal of the juice content therefrom.

There has heretofore been developed various fruit and vegetable juice extracting devices which operate on a number of different mechanical principles. One type of conventional extractor employs a multiple-ton press to crush the juice content out of the organic material. However, devices of this type are extremely cumbersome and cannot, therefore, be used domestically as a home kitchen appliance, for example. Moreover, unless the press is capable of exerting tremendous pressures on the fruits and vegetables the fibers of the material are not crushed or pulverized and the valuable mineral content contained within the fibers is not released so that it can be captured as a part of the juice content.

Other types of commercial juice extractors utilize grinding mechanisms of one type or another to crush lumps of fruit or vegetable material into a wet mash. Usually in these latter types of machines the juice is separated from the pulp by squeezing the wet mash through strainers or colanders. A principal disadvantage attendant with the employment of strain-

2 ers or colanders is that they invariably become clogged and require frequent cleaning. The juice output, therefore, in these types of juice extractors is generally very slow and dilatory.

A principal object of the present invention is to provide a highly efficient juice extractor of the character previously mentioned in which there is incorporated a pulverizing or grinding mechanism capable of grinding lumps of organic fruit and vegetable matter into a wet conglomerate mass of juice and pulp. The grinding or pulverizing mechanism is such that even the relatively hard and sinewy fibers of the organic material are crushed or ground up into a mushy state, whereby substantially all of the valuable mineral and food content of the vegetable or fruit material can be captured as a part of the juice content finally extracted.

Another principal object of the present invention is to provide a novel and continuous means in a juice extractor for separating the pulp content from the juice content of crushed fruit or vegetable material.

Another object is to provide a juice extractor of the character above mentioned which can be manufactured relatively inexpensively and which can be made sufficiently compact and light in weight to permit its utilization as a handy appliance in the home.

Other objects of the present invention are to provide a fruit juice extractor which is extremely simple to install and operate and which is exceedingly rugged in its construction.

Other objects of the present invention will become apparent upon reading the following specification and referring to the accompanying drawings in which similar characters of reference represent corresponding parts in each of the several views.

Fig. 2 is a sectional view taken on line 2—2 of Fig. 1.

Fig. 3 is a sectional view taken on line 3—3 of Fig. 1.

Fig. 4 is a perspective view of the extractor.

Figure 1:
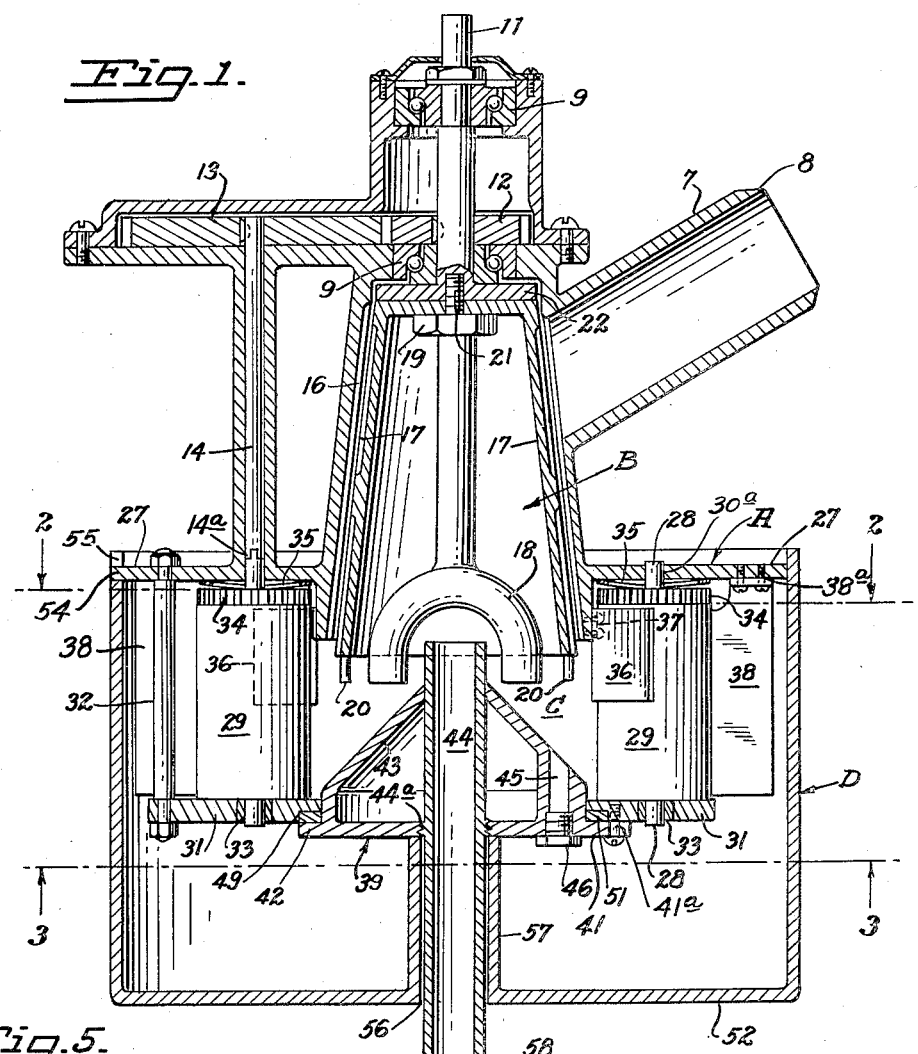
Fig. 1 is a side elevational view in section of the present invention.

Referring now more specifically to the drawings the present device comprises, generally, a housing A, a grinding or pulverizing mechanism B, a receptacle or container portion C, and a pulp catcher D.

The housing hereinabove indicated generally at A is provided with an admission port comprising a cylindrical hopper 7, which communicates to the hollow interior of the housing and which is formed with a beveled sharpened mouth 8. The upper portion of the housing mounts a pair of roller bearings, indicated at 9, which in turn, support rotatably the drive shaft 11. Housing A also encases a gear train comprising driving gear 12 mounted rigidly to shaft 11 and a driven gear 13 which is secured to and drives secondary drive shaft 14.

Figure 5:
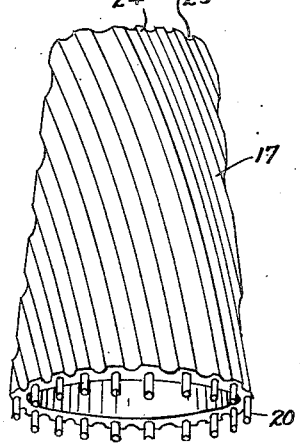
Fig. 5 is a perspective view of the rotatable grinding element.
Figure 6:
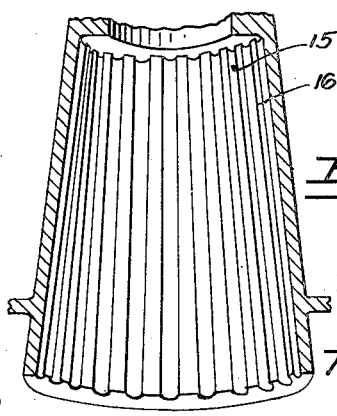
Fig. 6 is a perspective view of the stationary grinding element.

The hollow truncated conical shaped interior of housing A comprises a stationary grinding element or member and is formed with a plurality of longitudinally extending alternate grooves and flat ridges indicated respectively at 15 and 16 in Fig. 6. A rotatable grinding element, illustrated at 17 in Fig. 5, is almost identical in contour to the truncated conical shaped portion of the housing and is adapted to nest snugly within this portion of the housing. Grinding element 17 is mounted rotatably within housing A by means of an elongated wing bolt 18 which is provided with a shoulder 19 and a reduced threaded end or shank portion 21. The threaded end 21 of the wing bolt is adapted to be projected through an aperture provided in the top of the grinding element 17 for threadedly engaging a female threaded portion of drive shaft 11.

Drive shaft 11 is provided with an annular shoulder 22 against which the top of grinding element 17 can be securely clamped upon tightening of the wing nut. It is believed evident from the foregoing that rotation of shaft 11 will cause grinding element 17 to rotate correspondingly therewith within housing A.

Grinding element 17 is formed with alternate spirally extending grooves and ridges 23 and 24, respectively. An important feature of the present invention is the novel arrangement of the alternate grooves and ridges 15 and 16 of the housing and alternate grooves and ridges 23 and 24 of the rotatable grinding element 17. It is to be noted in the first place that edges 25 of each ridge of the housing and edges 26 of each ridge of the rotatable grinding element 17 are not rounded but define sharp and abrupt angles which, in turn, function as knife or cutting edges. Referring particularly to Fig. 2, it is seen that very little clearance is provided between the ridges 16 of the housing and ridges 24 of the rotatable grinding element 17. Therefore, when lumps of food material introduced through hopper 7 are subjected to the action of the grinding mechanism, the sharp edges on both the stationary ridges of the housing and rotating ridges of the grinding element will effectively coact to cut and grind and thereby pulverize the hard and sinewy fibers of the vegetable or fruit material. In view of the fact that the alternate grooves and ridges 23 and 24 of the rotatable grinding element are shown as extending spirally and in a direction generally counter-clockwise around the body of the truncated cone (when considering the starting point of each groove and ridge as beginning adjacent the top of the element 17) it is readily seen that upon rotation of the rotatable grinding element 17 in a clockwise direction the food being pulverized will be forwarded or forced in a direction downwardly toward and into container portion C of the device.

Other features of the grinding mechanism are that the thumb grip portion of the wing bolt 18 depends considerably beyond or below the base of the truncated conical shaped grinding element 17, and, in addition, a plurality of downwardly projecting lugs or tits 20 are provided around the base of the element 17. The reason for the above preferred arrangement of parts will be described hereinafter.

The base portion of housing A terminates in a wide flat circumferentially extending flange portion 27 and secondary drive shaft 14 extends therethrough.

The container portion of the device indicated generally at C hereinabove comprises a plurality (in this case 12) of cylindrical rollers or squeezers indicated at 29 arranged in circular formation. A plurality of apertures or journals 30ª are provided in the flange portion 27 of the housing and each aperture supports rotatably the top end of a roller shaft 28. An annular bearing plate 31, supported from the housing by bolts or posts 32 is provided with suitable apertures or journals 33 which rotatably mount therein the bottom ends of the roller shafts 28.

Referring particularly to the right side of Fig. 2 it is seen that alternate squeezers have relatively larger and smaller diameters. The rollers having the smaller diameters are indicated more specifically by the numeral 29ª and the rollers having the relatively larger diameters are designated by the numeral 29ᵇ. Each roller shaft 28 carries a spur gear 34, and it is to be observed that all of the spur gears 34 are of the same diameter and adjacent gears of adjacent rollers are in mesh engagement with one another. Disposed between each gear 34 and the flange portion 27 of the housing is a suitable concavo-convex split disc spring 35 which bears against the underside of shoulder portion 27 and the top of an associated gear 34 to spring bias the bottom of the squeezer or roller tightly against the bearing plate 31 to insure a liquid-tight seal between the roller and the bearing plate. As will appear more fully hereinabove it is essential that the squeezers or rollers be positioned snugly contiguous to one another to prohibit the escape of liquid between adjacent rollers.

One of the roller shafts 28 with its associated spur gear 34 is keyed as at 14ª to secondary drive shaft 14, whereby rotation of the latter causes corresponding rotation of the said roller shaft and associated gear. Because of the mesh engagement between adjacent spur gears 34 (all of the same diameter) alternate rollers will be driven in opposite directions at the same rotative speeds. In view of the fact, however, that alternate rollers are of relatively larger and smaller diameters all of the rollers will not be driven at the same peripheral speed. More specifically the smaller rollers 29ª will rotate at a slower peripheral speed than the larger rollers 29ᵇ. The particular advantage of such an arrangement of parts will be described more fully hereinafter. Assuming as in the instant case there are 12 rollers comprising the circular wall structure and that alternate rollers rotate in opposite directions, there will be established six points indicated at 30 whereat adjacent contacting rollers will rotate appropriately to squeeze the pulp content of the pulverized food material or mash between them and in such manner that the pulp will be carried outwardly from the interior of the container defined by the said rollers.

Six baffles 36 are attached to housing A, as indicated at 37, and depend downwardly therefrom to a location adjacent the aforementioned six pulp extruding roller contact points 30. Baffles 36 are preferably about one-half as long as the rollers and are adapted to function as pulp traps as will hereinafter more clearly appear.

For every roller there is provided a depending scraper blade 38, each of which is attached as at 38ᵃ to the underside of the flanged portion 27 of the housing. Each scraper blade extends the length of its associated roller and its inner edge is arranged so as to be in contact with the side of a roller to scrape pulp off of the roller as the latter revolves during juice extracting operations. Numeral 39 indicates generally the principal cleaning and drain plug of the device and functions as a removable bottom for container C in which, as has already been described, rollers 29 form the sides thereof. More specifically, plug 39 is adapted to plug the central opening formed in bearing plate 31 and comprises a base portion 41 having a flange portion 42 and conically shaped walls 43 extending upwardly from base portion 41. A siphon conduit 44 projects upwardly through the center of plug 39 and may be threadedly secured thereto as at 44ᵃ. A secondary drain or siphoning conduit 45 extends through the plug 39 and a threaded screw cap 46 is adapted to serve as a closure therefor. Suitable bayonet-type coupling elements, such as indicated at 41, may be provided on the underside of the bearing plate 31 to engage complementary screws 41ᵃ provided on the flange portion 42 of the drain plug 39 to secure the latter, upon partial rotation thereof, removably and securely in place within the center opening formed in the bearing plate. The inner edge of the ring shaped bearing plate 31 is preferably notched, as at 49, to receive a washer or gasket 51, whereby a positive liquid seal between the plug 39 and bearing plate 31 is established when the plug has been operatively positioned with respect to the said bearing plate by coupling elements 41 and 41ᵃ.

A cylindrical pulp catcher or container 52 is attached removably to flange portion 27 of housing A by complementary bayonet-type coupling elements comprising lugs 54 projecting outwardly from the housing and lug receiving cut-outs 55 formed around the mouth of the pulp catcher at spaced intervals. A central opening 56 is formed through the bottom of the pulp catcher and a centrally located upwardly extending sleeve portion 57 is provided around opening 56. Sleeve 57 of the pulp catcher is adapted to fit slidably over siphoning conduit 44, and thus, rapid removal of the pulp catcher may be effected by partially turning the catcher to disengage lugs 54 from notches 55 and then dropping the catcher downwardly until sleeve 57 slides beyond the end 58 of the drain conduit 44.

In operation drive shaft 11 is hooked to a suitable source of power, such as an electric motor, to rotate at fairly high speeds the shaft 11 and rotatable grinding element 17. Lumps of food material (not shown), such as vegetable or fruit, may be introduced by hand into hopper 7. If the lumps are slightly over size beveled sharpened edges 8 formed around the mouth of hopper 7 will function to shave the material down to the interior diameter of the admission port. The action of the grinding elements will pulverize and crush the food material in the manner previously described and will forward it in the form of a wet mash (consisting of juice and pulp) downwardly toward and into container C formed by squeezers 29 and plug 39.

Rotation is imparted to rollers 29 off of drive shaft 11 via gears 12 and 13, secondary drive shaft 14 and the twelve spur gears 34. The speed of the rollers may be reduced comparatively with the speed of the drive shaft 11 by making gear 13 considerably larger than gear 12.

As has been previously noted the depending thumb grip portion of wing bolt 18 and the depending lugs or tits 20 of the grinding element 17 rotate with the latter. Thus, when once a sufficient quantity of the pulverized food material or mash has been introduced into chamber C to bring the mash level up to members 18 and 20, these latter elements will, in turn, agitate the mash and by centrifugal action continually throw or force the pulp content of the mash outwardly toward the rotating rollers. The pulp which is forced centrifugally outwardly toward the rollers impinges against the baffles 36 which are located adjacent the six pulp extruding roller contact points 30. The object in providing the baffles is to slow down or impede the movement of the pulp in order to give the rollers more time to act on the pulp and to squeeze it outwardly from within the container C. The action of rollers 29 on the pulp content of the mash (at contact points 30) is in many ways analogous to the commonly observed action of conventional washing machine wringers or rollers on laundered articles being fed therethrough. More particularly, rollers 29 of the instant device act to squeeze juice from the pulp content of the mash and to simultaneously carry the pulp outwardly from within the container leaving the squeezed juice within the container.

In view of the fact that the squeezers comprising each pair rotate at different peripheral speeds, as above pointed out, the pulp passing between the squeezers is subjected to a constant rubbing or chafing action which tends to further pulverize and grind to a finer consistency the pulp and to thereby insure the recovery of the greatest possible quantity of juice from the mash. Scraper blades 38 continually scrape from the surface of the rollers the pulp which tends to adhere thereto as a result of the squeezing action of the rollers on the pulp. Pulp which is carried off from the interior of the container C by the rollers is scraped off and deposited within the pulp catcher D which, in turn, may be removed from the device and emptied at frequent intervals if need be. The juice content of the mash which remains in the container C will after reaching a level within the container corresponding to the top of siphon conduit 44 overflow into the conduit and gravitate downwardly therethrough for recovery. With respect to the above it is contemplated that an operator may place a drinking glass or other suitable receptacle directly beneath the bottom end 58 of conduit 44 to capture the juice dripping or flowing therefrom.

To clean the device an operator (after disconnecting shaft 11 from its power source and after removing pulp catcher D in the manner previously indicated) may unscrew plug 46 to permit any juice or liquid content which remains within container C to drain through conduit 45. Cleaning and drain plug 39 may then be partially rotated to disengage locking lugs 41 from complementary elements 41ᵃ to permit withdrawal of the plug from the central opening formed in pressure plate 31. After removal of plug 39 manual access may be had to the thumb grip portion of wing bolt 18 which can be unscrewed from drive shaft 11. Unscrewing of the wing bolt from shaft 11 permits withdrawal of rotatable grinding element 17 from the housing to permit cleaning of both the interior of the housing and the said rotatable grinding element.

Although I generally consider it preferable in most instances to make the clearance between the ridges 24 of the rotatable grinding element and the ridges 16 of the stationary grinding element extremely small, it is believed readily understandable that if for one reason or another it is desired to make these clearances greater that all an operator need do is to mount a washer or gasket (not shown) of desired thickness around reduced threaded shank portion 21 of wing bolt 18 and between the top surface of grinding element 17 and shoulder 22 of the drive shaft. The greater the thickness of a washer or gasket that is positioned between the top of grinding element 17 and shoulder 42 the less snugly will the element 17 fit into its housing and therefore, the greater will be the clearances established between ridges 24 and 16 of the element 17 and housing A respectively.

Although I have described my invention in some detail by way of illustration and example for purposes of clarity of understanding, it is understood that certain changes and modifications may be made within the spirit of the invention and scope of the appended claims.

I claim:

1. A device for extracting juice from lumps of food material such as fruits, vegetables and the like comprising, a housing having an admission port communicating with the interior of said housing, a rotatable drive shaft journaled in said housing, a grinding mechanism to pulverize lumps of food material introduced into the interior of said housing through said admission port to form a wet mash of pulp and juice, said grinding mechanism comprising a grinding element removably attached to said drive shaft and disposed rotatably in said housing, said grinding element and said housing shaped in the form of a truncated cone and both said grinding element and said housing being formed with longitudinally extending alternate grooves and ridges, a substantially liquid-tight container, the side walls of said container comprising a plurality of rotatable cylindrical squeezers, the bottom of said container comprising a plug removably attached with respect to said housing and said squeezers and in liquid seal relationship with said housing, the grooves and ridges formed in said grinding element and said housing arranged to forward the mash into said container, and means associated with said drive shaft to rotate said squeezers, whereby said squeezers coact to squeeze the juice from the pulverized material forwarded to said container and to carry the pulp outwardly from said container.

2. A device according to claim 1 and wherein agitators associated with said grinding element are provided to centrifugally force the pulp of the pulverized material toward said squeezers, and wherein traps comprising baffles depending from the lower part of the housing into the interior of the container adjacent the squeezers are provided to impede movement of the pulp interiorly of said container past said squeezers.

3. In a device for extracting juices from lumps of food material such as vegetables, fruits and the like, having a pulverizing mechanism to convert lumps of food material into a wet mash consisting of juice and pulp, the combination comprising; a substantially liquid-tight container having sides and a bottom piece and adapted to contain the wet mash of material received from the pulverizing mechanism, the sides of said container comprising an even number of vertically disposed, rotatable, cylindrical squeezers arranged in circular formation, each squeezer closely contacting throughout its length the two squeezers located immediately adjacent it on opposite sides thereof whereby a liquid-tight seal between the squeezers is established, said bottom piece comprising a plug removably attached with respect to said squeezers and in liquid seal relationship with respect to said bottom piece, and driving means to rotate adjacent squeezers in opposite directions.

4. A combination according to claim 3 and wherein the adjacent squeezers have relatively larger and smaller diameters.

5. A combination according to claim 3 and wherein the adjacent squeezers have relatively larger and smaller diameters, and wherein said driving means comprises a gear train arranged to drive all of said squeezers at the same rotative speed whereby the squeezers having the relatively larger diameters rotate at a faster peripheral speed than the squeezers having the relatively smaller diameters.

6. A device for extracting juice from lumps of food material such as fruits, vegetables and the like comprising, a housing having an admission port communicating with the interior of said housing, a grinding mechanism comprising a rotatable grinding element mounted in said housing adapted to pulverize lumps of material introduced into the interior of said housing through said admission port and to convert the lumps of material into a wet mash of pulp and juice, and a substantially liquid-tight container having sides comprising a plurality of rotatably mounted, cylindrical squeezers and a bottom comprising a plug removably attached with respect to said squeezers, said plug together with said squeezers forming a liquid-tight chamber, and said grinding mechanism operating to forward the pulverized material into said container, said squeezers adapted upon rotation to squeeze the juice from the pulp and carry the latter outwardly from said container.

TELESPHORE J. BEAUDET.

REFERENCES CITED

The following references are of record in the file of this patent:

UNITED STATES PATENTS

| Number | Name | Date |
|---|---|---|
| 52,472 | Wells | Feb. 6, 1866 |
| 131,352 | Hyde | Sept. 17, 1872 |
| 366,165 | Gray | July 5, 1887 |
| 1,030,186 | Joseph | June 18, 1912 |
| 1,226,758 | Dufty | May 22, 1917 |
| 1,354,528 | Wertenbruch | Oct. 5, 1920 |
| 1,440,892 | Porter | Jan. 2, 1923 |
| 1,484,003 | Bennett | Feb. 19, 1924 |
| 2,159,536 | Searle | May 23, 1939 |

FOREIGN PATENTS

| Number | Country | Date |
|---|---|---|
| 602,998 | France | Jan. 5, 1926 |